United States Patent [19]

Nakade et al.

[11] Patent Number: 5,424,021
[45] Date of Patent: Jun. 13, 1995

[54] METHOD OF MAKING A SHOCK RESISTANT TOOL COMPRISING A FIBER REINFORCED CYCLOPENTADIENE RESIN MATRIX

[75] Inventors: Shinichi Nakade, Itami; Tetsuo Yamaguchi, Nishinomiya; Kunio Niwa; Masaru Kohno, both of Kobe, all of Japan

[73] Assignee: Sumitomo Rubber Industries, Limited, Hyogo, Japan

[21] Appl. No.: 115,360

[22] Filed: Sep. 2, 1993

Related U.S. Application Data

[63] Continuation of Ser. No. 737,036, Jul. 29, 1991, abandoned.

[30] Foreign Application Priority Data

Jul. 31, 1990 [JP] Japan .................. 2-205690
Jul. 3, 1991 [JP] Japan .................. 3-162851

[51] Int. Cl.6 ............................................ B27N 3/10
[52] U.S. Cl. .................................. 264/257; 264/267; 264/328.1; 264/328.2
[58] Field of Search ............ 428/285, 408, 902; 264/328.6, 328.1, 328.2, 523, 328.7, 512, 516, 257, 267, 270; 525/111, 113, 211

[56] References Cited

U.S. PATENT DOCUMENTS

| 4,473,616 | 9/1984 | Rademacher | 428/285 |
| 4,500,595 | 2/1985 | Gerteisen et al. | 428/902 |
| 4,708,969 | 11/1987 | Leach | 525/211 |
| 4,849,486 | 7/1989 | Tsuchiya et al. | 525/152 |

FOREIGN PATENT DOCUMENTS

| 0344693 | 12/1989 | European Pat. Off. |
| 128077 | 11/1989 | Japan . |
| 2302280 | 12/1990 | Japan . |

*Primary Examiner*—James D. Withers
*Attorney, Agent, or Firm*—Birch, Stewart, Kolasch & Birch

[57] ABSTRACT

A method for forming a shock resistant tool comprising reinforcing fiber used as a reinforcing material and cyclopentadiene resin used as matrix resin by reaction injection molding method. Cyclopentadiene resin is superior in shock resistant performance and has a low melt viscosity, thus allowing fiber to be contained in the shock resistant tool at a high percentage.

3 Claims, 9 Drawing Sheets

METHOD OF MAKING A SHOCK RESISTANT TOOL COMPRISING A FIBER REINFORCED CYCLOPENTADIENE RESIN MATRIX

This application is a continuation, of application Ser. No. 07/737,036 filed on Jul. 29, 1991, now abandoned.

BACKGROUND OF THE INVENTION

1. Field of the invention

The present invention relates to tools resistant to a mechanical shock and more particularly to tools likely to be subjected to a shock listed below.
1. Sporting goods such as a tennis racket frame, squash racket, badminton racket for absorbing a shock applied by a ball.
2. Sporting goods for absorbing a shock such as helmet; fencing plastron, fencing face-guard: crotch protecting tool; football shoulder protecting tool; ice hockey mask; ice hockey knee pad and elbow pad; soccer, squash racket, leg guards; ear protecting portion of water polo cap; horse saddle and the like.
3. Helmets for protecting head from accidental shock in riding car or bicycle, in construction work, and infant's play.
4. Bicycle frame, bicycle handle, canoe and the like for absorbing a shock and preventing breakage against a shock.
5. Protecting wall, against machine tool, for preventing the transmission of a shock.

2. Description of the related art

Conventionally, goods required to have a shock resistant performance are made of ABS resin, polycarbonate resin, fiber reinforced resin (FRP) formed by reinforcing thermoplastic resin with short fiber or fiber reinforced resin (FRP) formed by reinforcing thermosetting resin generally with chopped strand mat of glass. The chopped strand mat of glass may be replaced by continuous fiber, long fiber or short fiber consisting of glass fiber, carbon fiber, aramid fiber, boron fiber or ultra-high-molecular-weight polyethylene fiber. Unsaturated polyester resin is mainly used as matrix resin.

The following methods are used to manufacture the above fiber reinforced resins formed by reinforcing thermosetting resin with chopped strand mat of glass: a half-hardened prepreg formed by impregnating fiber with resin is cut to an appropriate size and a configuration, and then, cut materials are laminated on each other in a die, then, heated under pressure so as to harden the resin; chopped strand and resin are sprayed up in a die and then hardened; reinforced fibers are laminated on a balloon-shaped die, then, the reinforcing fiber is impregnated with resin and then, hardened.

Comparing the above materials and manufacturing methods, shock resistant tools made of only ABS resin or polycarbonate resin do not have a favorable rigidity because they do not contain a reinforcing material. Compared with long fiber or continuous fiber, fiber reinforced resin (FRP) formed by reinforcing thermoplastic resin with short fiber has also an unfavorable rigidity.

In the case of the fiber reinforced resin (FRP) formed by reinforcing thermosetting resin with chopped strand mat of glass, shock resistant performance of molded goods can be increased by using reinforcing fiber and matrix resin favorable in shock resistant performance and increasing the content percentage of reinforcing fiber. But it is uneasy to increase fiber content and the method for manufacturing the above shock resistant goods has problems.

That is, fiber content percentage can be increased by cutting the prepreg sheets having thermosetting resin impregnated therein to a certain configuration, laminating cut materials on a die, and heating them under pressure. But the molded goods is inferior in shock resistant performance because thermosetting resin is inferior in shock resistant performance. In addition, this method has an unfavorable production cycle and moreover, the manufacturing cost is high.

Further, in spray-up method or bag method, glass fiber and unsaturated polyester are used in combination. These systems have a disadvantage that resin does not penetrate through fine gaps between fibers, and voids are left between filaments. The disadvantage is attributed to the high viscosity of resin. When resin is injected at a high pressure to accelerate the permeation of resin between fibers, fiber are moved and twisted by the flow of resin. Thus, resin cannot be injected at a high pressure. Therefore, fiber cannot be contained at a high percentage in a shock resistant tool. For example, fiber is contained in a helmet commercially available at approximately 30% at most.

SUMMARY OF THE INVENTION

It is an essential object of the present invention to provide a shock resistant tool having a high fiber content percentage and a favorable shock resistant performance and a method for manufacturing the shock resistant tool.

In accomplishing these and other objects, cyclopentadiene resin is used as matrix resin because it has a favorable shock resistant performance and increases fiber content percentage due to its low viscosity before polymerization takes place. Cyclopentadiene resin is injected into a die, by reaction injection molding method, ill which reinforcing fiber is placed to obtain a shock resistant tool molded in a desired configuration.

More specifically, a shock resistant tool comprises fiber reinforced resin molded by reaction injection molding method using at least one of reinforcing fiber of ultra-high-molecular-weight polyethylene fiber, carbon fiber, glass fiber, aramid fiber, alumina fiber, silicon carbide fiber, steel fiber, amorphous metal fiber, organic fiber and/or a combination thereof as a reinforcing material; and cyclopentadiene resin as matrix resin.

As the reinforcing fiber of the fiber reinforced resin of the shock resistant tool, continuous fiber, long fiber or short fiber is used. When a high rigidity and, a high strength are required, the continuous fiber or the long fiber is used. As an example of the reinforcing fiber, cloth fiber, filament winding, a mat in random arrangement such as continuous strand mat are preferably used.

Preferably, fiber is contained in the shock resistant tool at more than 40% in a region in which fiber is required to be contained at the highest percentage. Reinforcing fiber is contained therein at a varied percentage depending on a region, i.e., a region to which shock is applied greatly contains the reinforcing fiber at a high percentage and a region to which shock is applied in a small extent contains the reinforcing fiber at a low percentage. Thus, the shock resistant tool is light and its production cost is reduced. For example, a shoulder protector for use in football, fiber is contained at 40% in shoulder and 20% in chest.

Preferably, nonwoven fiber is used in combination of the reinforcing fiber as the fiber reinforcing material. It is preferable that only nonwoven fiber is used in a region in which a high strength is not required or nonwoven fiber is used at a percentage higher than the reinforcing fiber.

It is also preferable that nonwoven cloth allowing a smooth flow of resin during a molding operation and reducing the weight of the shock resistant tool, thus reducing cost is distributed at a varied percentage according to a region. For example, the flange of a baseball helmet consists of nonwoven cloth.

The following materials are used as the nonwoven cloth to be distributed in the outer side of the fiber reinforced resin and the surface of the inner side and/or intermediate portion thereof: glass fiber paper, carbon fiber paper, polyester nonwoven cloth, nylon nonwoven cloth, vinyl nonwoven cloth, ultra-high molecular-weight polyethylene nonwoven cloth, PPS nonwoven cloth, acrylic fiber nonwoven cloth and the like.

Favorably, fiber density of the nonwoven cloth ranges from 1 to 35 vol% and more favorably from 2 to 20 vol% so that resin flows smoothly during a molding operation.

Preferably, one or more kinds of fibers containing ultra-high molecular-weight polyethylene fiber is used as the reinforcing fiber.

Shock resistant tools molded in a die by the reaction injection molding method include sporting goods such as helmet, face-guard, pad, leg guards for protecting head, face, plastron, shoulder, elbow, knee and the like; racket frame such as tennis racket frame for use in ball games; helmets for protecting head from shock in riding car or bicycle and for construction work; vehicle frame including bicycle frame and bicycle handle, canoe frame for preventing breakage against a shock; and protecting wall, against machine tool, for preventing the transmission of a shock.

When a shock resistant tool is a racket frame, the racket frame contains ultra-high-molecular-weight polyethylene fiber at least 10 wt. % in the reinforcing fiber and a resin layer including the nonwoven cloth in the inner portion, outer portion and/or intermediate portion of the fiber reinforced resin consisting of the cyclopentadiene resin reinforced with the fiber reinforcing material.

In the method for molding shock resistant tools, preferably, reinforcing fiber and nonwoven cloth are provided in the outer side, inner side and/or the gap between reinforcing material layers. The material thus preformed is placed in a die. Then, cyclopentadiene containing polymerization catalyst and initiator of polymerization is injected into the die, and the mixture is heated at a predetermined temperature, for example, lower than 130° C. so as to mold it into crosslinked resin by two-solution injection molding method (RIM).

In the above-described method, after the reaction solution is injected, the preformed material is compressed against the surface of the die with sheet-shaped rubber shaped into the configuration in conformity with that of the die and the preformed material, and extra resin is discharged from a resin discharge opening. Thus, fiber content percentage can be increased.

In order to preform the material, the following methods are used: molding by means of a die; spray-up of short fiber and chopped strand mat; and molding by heating and pressure application of a reinforcing material to which a binder has been attached.

As polymerization monomer used as the cyclopentadiene resin, dicyclopentadiene, dihydrodicyclopentadiene, tricyclopentadiene, tetracyclopentadiene, cyclopentadienemethylpentadiene copolymer are used.

As the polymerization catalyst, halide of tungsten, molybdenum, tantalum; oxyhalide; oxide; organic ammonium salt are preferably used.

As the polymerization starting agent, organic metal compound, mainly alkyl of metal of I through III groups of periodic table, compounds of alcohol, phenol or the like are preferably used.

Since a polymerization reaction is started very promptly in a solution containing the catalyst and activator, hardening may occur before a sufficient amount of solution flows into the mold. Therefore, monoether and/or monoester of a glycol compound selected from alkylene glycol or polyalkylene glycol are preferably used as an activity adjusting agent.

In injection molding in the die, the die is heated at 40° to 130° C. and polymerization reaction takes place for one to five minutes.

The material of a shock resistant tool is provided on a flexible core (internal pressure holding member) which conforms to the surface configuration of the die. Tube-shaped or bag-shaped materials such as nylon, cellophane, rubber, polyester, polyether ketone or the like is preferably used.

As described above, a shock resistant tool according to the present invention such as a racket frame or a helmet is formed in combination of reinforcing fiber and cyclopentadiene resin superior in shock resistant performance. Since cyclopentadiene resin to be used as matrix resin has a low melt viscosity, fiber can be contained at higher than 50%. Therefore, the shock resistant performance of the tool according to the present invention can be improved as compared with conventional ones. For example, comparing a helmet according to the present invention and a conventional helmet commercially available with each other, energy required to destroy the helmet according to the present invention is approximately twice as great as that required to destroy the conventional helmet. This data is obtained as a result of tests which is described later.

Compared with the shock resistant performance of conventional tools, in addition to shock resistant performance, vibration damping performance, chemical resistant property, and weather resistant property are improved.

When ultra-high molecular-weight polyethylene fiber and cyclopentadiene resin are used in combination, vibration damping performance is superior, so that vibration damping ratio can be made at a high percentage, namely, higher than 0.8%. Therefore, a tennis racket frame comprising the above mixture does not apply a great force to elbow, so that it is preferably used by a powerless player. Vibration damping characteristic is preferable by providing a layer consisting of 95% of matrix resin and 5% of nonwoven cloth, namely, a layer containing much amount of resin and a small amount of nonwoven cloth. According to this distribution of ultra-high-molecular-weight polyethylene fiber and cyclopentadiene resin, the external appearance of a tool is preferable.

Further, according to the manufacturing method, the material of the tool can be placed in a die by controlling the fiber angle, fiber amount, and fiber thickness. In addition, since the fiber reinforcing material is preformed, the molding cycle is preferable, and hence an efficient productivity can be obtained.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Referring now to the drawings, an embodiment of the present invention is described below.

Figure 1:
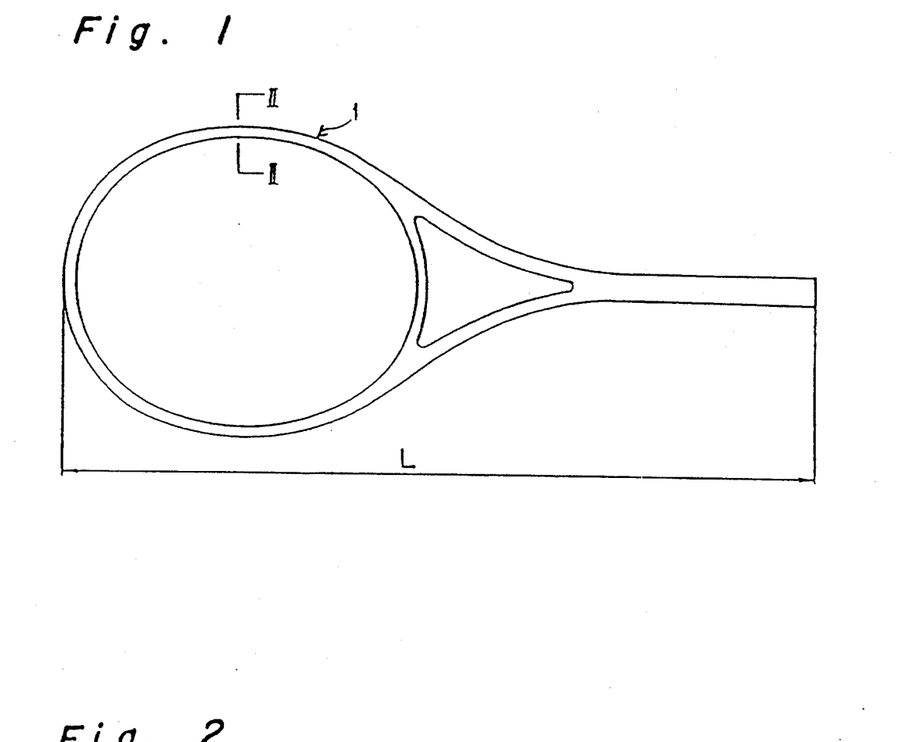
FIG. 1 is a plan view showing a tennis racket frame according to a first embodiment of the present invention.

FIG. 1 shows a shock resistant tennis racket frame 1 according to a first embodiment of the present invention. Its length ranges from 52 cm to 68 cm (68 cm according to the first embodiment) and its weight ranges from 230 g to 400 g (335 g according to the first embodiment).

The vibration damping ratio of the tennis racket frame 1 is 0.8% which is greatly improved compared with conventional tennis rackets.

Figure 2:
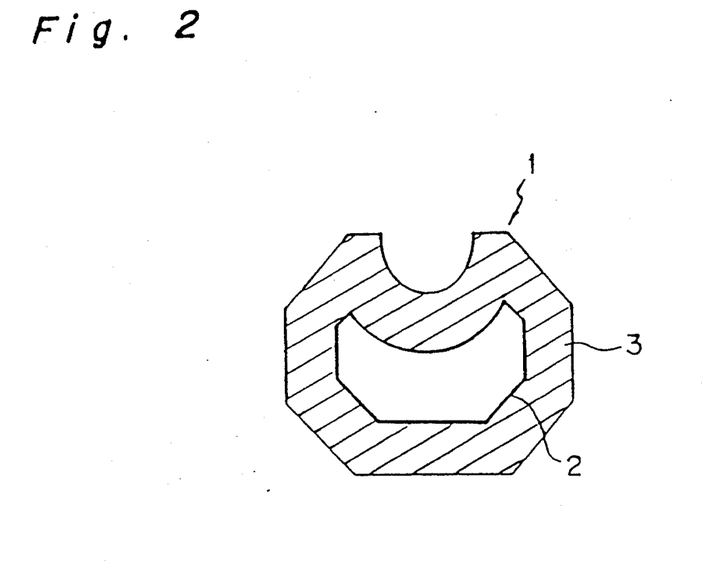
FIG. 2 is a sectional view taken along a line II—II of FIG. 1.

As shown in FIG. 2, the tennis racket frame 1 comprises a core nylon tube 2 and a fiber reinforced resin layer 3 consisting of cyclopentadiene resin containing continuous fiber, consisting of ultra-high molecular-weight polyethylene fiber and carbon fiber, formed in the periphery of the core nylon tube 2.

The racket frame 1 is manufactured by two-solution-reaction injection molding (RIM) method which will be described below.

The core tube 2 is made of a nylon tube in the thickness of 100 μm and braided carbon fiber (article number: BC-7664-24 (20), manufactured by Toho Rayon Co., Ltd.) is arranged in the periphery of the core nylon tube 2 so that each braided carbon fiber makes 24° with the longitudinal direction of the tennis racket frame 1 and the weight of the braided carbon fiber is 40 wt. %. Braided fiber consisting of ultra-high-molecular-weight polyethylene fiber (SK-60, manufactured by Toyobo Co., Ltd.) is provided so that the braided fiber makes 24° with the longitudinal direction of the tennis racket frame 1 and the weight of the braided carbon fiber is 20 wt. %.

The carbon fiber and ultra-high-molecular-weight polyethylene fiber are braided and cut so that the angle of the braided fiber makes the above-described angle, and they are preformed so that the configuration of the braided fiber conforms to that of the tennis racket frame 1. The preforming method is described later in the description of a baseball helmet according to a second embodiment. The preformed fiber reinforcing material is arranged on the periphery of the core nylon tube 2.

After the fiber reinforcing material is set in a die and the die is heated at 60° C. Then, the pressure in the die is reduced by a vacuum pump.

Then, dicyclopentadiene containing polymerizing catalyst and initiator of polymerization is placed in the die under pressure. That is, a desired amount of dicyclopentadiene is contained in two containers. Polymerizing catalyst is put into one container and an activator (initiator of polymerization) and an activity adjusting agent are put into the other container so as to prepare two stable reaction solutions. The reaction solutions are mixed with each other instantaneously by a mixing head of a two-solution reaction/injection molding device. The mixture is immediately injected into the die heated at 60° C. under a low pressure.

In the die, internal pressure is applied to the core nylon tube 2 for one to five minutes to polymerize the mixture promptly. Thus, a hollow tennis racket frame as shown in FIG. 2 is obtained.

Figure 3:
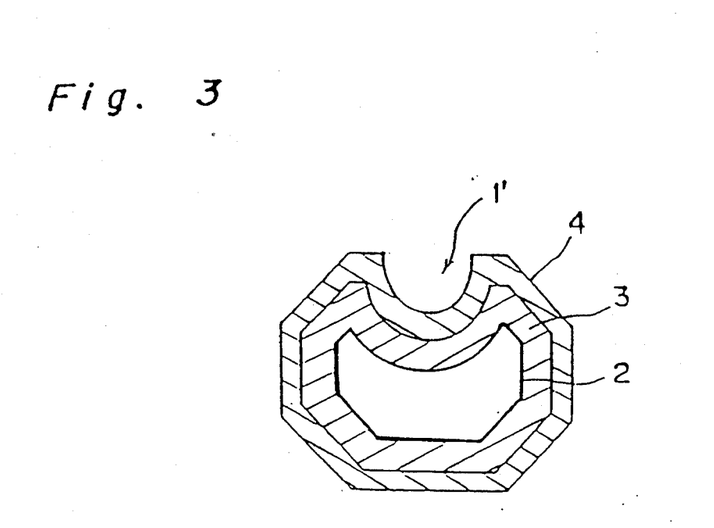
FIG. 3 is a sectional view showing a first modification of the first embodiment.

FIG. 3 shows a first modification of the tennis racket frame of the first embodiment. The tennis racket frame 1' comprises the core nylon tube 2, a fiber reinforced resin layer 3 consisting of cyclopentadiene resin containing continuous fiber consisting of ultra-high-molecular-weight polyethylene fiber formed in the periphery of the core nylon tube 2, and a nonwoven cloth containing layer 4 consisting of cyclopentadiene resin containing glass nonwoven cloth formed in the periphery of the fiber reinforced resin layer 3.

The length and weight of the tennis racket frame 1' are similar to those of the first embodiment, and the vibration damping ratio thereof is 2.5% which is improved greatly compared with conventional ones.

The method for manufacturing the tennis racket frame 1' having the nonwoven cloth containing layer 4 is almost same as that of the first embodiment. The first modification of the first embodiment is different from the first embodiment in that the glass nonwoven cloth is provided on the surface of the ultra-high-molecular-weight polyethylene fiber provided in the periphery of the core nylon tube 2 so that the weight percentage of the glass nonwoven cloth is approximately 5%.

Figure 4:
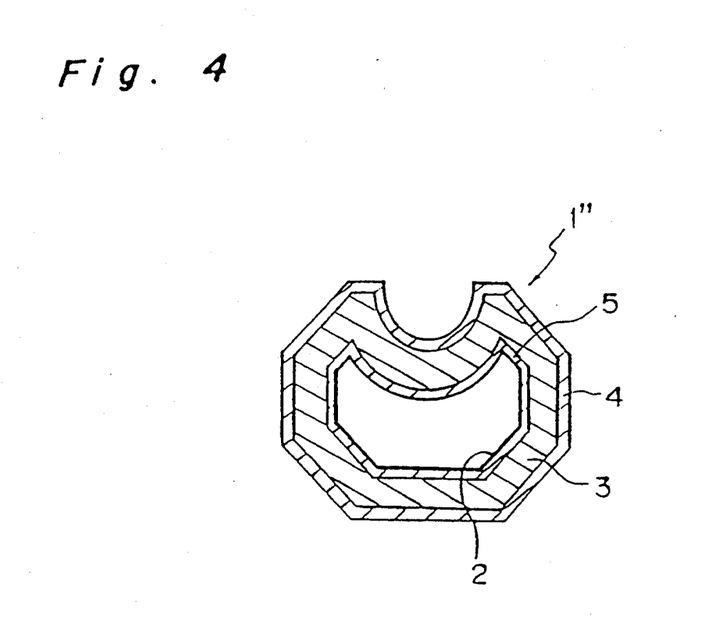
FIG. 4 is a sectional view showing a second modification of the first embodiment.

FIG. 4 shows a tennis racket frame 1" of a second modification of the tennis racket frame of the first embodiment. The tennis racket frame 1" comprises the nylon tuber core 2, an inner nonwoven cloth containing layer 5 consisting of cyclopentadiene resin containing glass nonwoven cloth formed in the periphery of the nylon tuber core 2, a fiber reinforced resin layer 3 consisting of cyclopentadiene resin containing continuous fiber consisting of ultra-high-molecular-weight polyethylene fiber formed in the periphery of the layer 5, and an outer nonwoven cloth containing layer 4 consisting of cyclopentadiene resin containing glass nonwoven cloth formed in the periphery of the layer 3. The configuration and weight of the tennis racket frame 1" according to the second modification are similar to those of the tennis racket frame 1 according to the first embodiment and the vibration damping ratio thereof is 3.5%.

The method for manufacturing the tennis racket frame 1" according to the second modification is almost same as that of the first embodiment. The glass nonwoven cloth is formed in the periphery of the nylon tube core 2, the continuous fiber layer consisting of ultra-high-molecular-weight polyethylene fiber is formed in the periphery thereof, and the glass nonwoven cloth is formed in the periphery thereof. The nonwoven cloth containing layer may be arranged in the middle layer, but it is preferable to arrange it on the surface of the tennis racket frame in view of the external appearance thereof.

As the reinforcing fiber, ultra-high-molecular-weight polyethylene fiber and carbon fiber are used in the first embodiment, and only ultra-high-molecular-weight polyethylene fiber is used in the first and second modifications. But the following fibers may be used in combination of ultra-high molecular-weight polyethylene fiber: glass fiber, aramid fiber, alumina fiber, silicon carbide fiber, steel fiber, amorphous metal fiber, organic fiber and/or a combination thereof. Preferably, the weight percentage of ultra-high-molecular-weight polyethylene fiber is more than 10 wt. % of the reinforcing fiber material in view of vibration damping performance and shock absorbing performance.

It is preferable that except the nonwoven resin layer, the fiber reinforcing resin layer comprising cyclopentadiene resin contains reinforcing fiber made of a material formed in combination of the above-described materials or reinforcing fiber consisting of ultra-high-molecular-weight polyethylene fiber in 20 to 80 wt. %.

Experiment 1

The shock resistant performance, namely, the strength of the tennis racket frame of the above construction according to the present invention was compared with that of conventional tennis racket frames. The result is described below.

Figure 5:
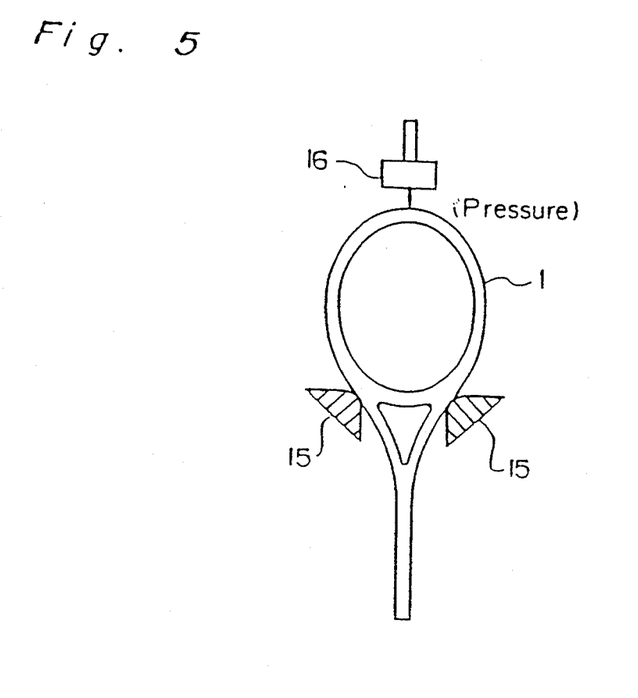
FIG. 5 is a schematic view showing strength testing method according to the first embodiment.

As shown in FIG. 5, the tennis racket frame 1 was erected by supporting both sides thereof with a supporting jig 15. A dead load was applied to the tennis racket frame 1 at the top end thereof by a pressure applying device 16 provided above the tennis racket frame 1 so as to measure its destruction strength.

The tennis racket frames of the first modification was used to compare shock resistant performance according to the present invention with conventional example tennis racket frames made of epoxy prepreg material and in the same configuration as the racket frame of the first modification.

Embodiment 2 (four frames on average) 162 kg

Conventional B (four frames on average) 160 kg

It was confirmed that the strength of the tennis racket frame of the embodiment was higher than that of the conventional one.

The vibration damping characteristic of the tennis racket frames of the present invention were compared with that of conventional tennis racket frames. Tests were conducted on the following embodiment (A) and conventional example (B).

A: tennis racket frames according to the first embodiment, the first modification, and the second modification (weight: 335 g; length: 68 cm)

B: conventional tennis racket frames made of an epoxy prepreg material and the configurations thereof are same as those of (A)

Figure 6:
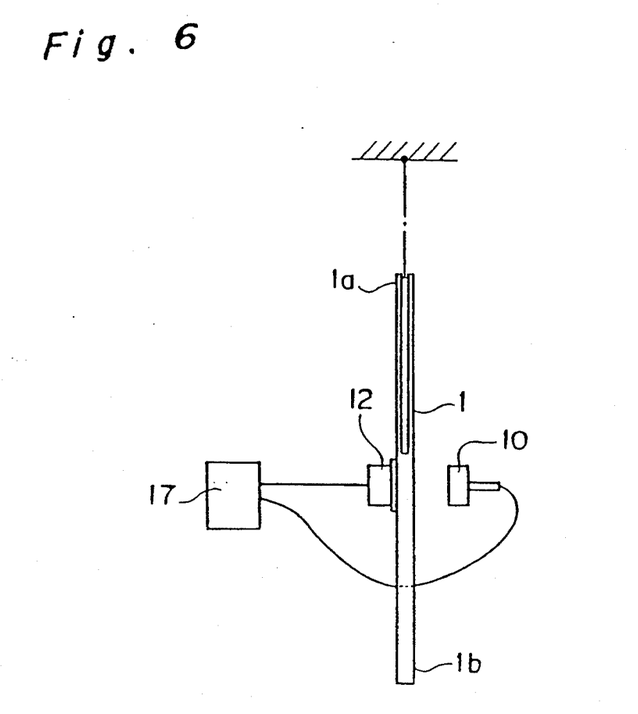
FIG. 6 is a schematic view showing a testing method for examining vibration damping characteristic according to the first embodiment.

Experiments for examining vibration damping characteristics were made by a device as follows as shown in FIG. 6. That is, the tennis racket frame 1 was hung by a string with the head portion 1a thereof upward. An acceleration pick-up 12 was attached to one side of the tennis racket frame 1 at approximately the center between the head portion 1a and a gripping portion 1b. The other side of the tennis racket frame 1 was struck with an impact hammer 10. An FET analyzer 17 was connected with the hammer 10 and the acceleration pick-up 12.

Figure 7:
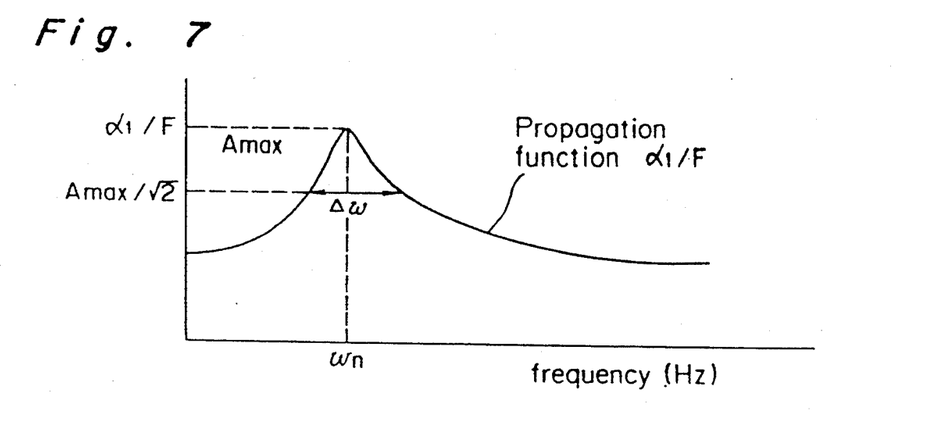
FIG. 7 is a diagrammatic view showing vibration damping waveform obtained by a vibration damping characteristic test.

A vibration generated when the tennis racket frame 1 was struck with the hammer 10 was received by the acceleration pick-up 12 and a signal was inputted to the FET analyzer 17. As a result, a graph as shown in FIG. 7 was obtained. In the graph, acceleration ($\alpha$)/force (F) is ordinate and frequency is abscissa. Vibration damping characteristics were obtained by $\Delta\omega/2\omega n$.

Vibration damping ratios were calculated based on the graph. The result was:
First embodiment: $\zeta = 0.8\%$
First modification: $\zeta = 1.2\%$
Second modification: $\zeta = 1.6\%$ The vibration damping ratio $\zeta$ of the conventional example (B) was 0.2% to 0.3% (10 tennis racket frames were used on average.)

A test for examining players' feeling for tennis ball hittings was conducted.

Fifty players hit tennis balls with rackets of (A) and (B). The result is shown below.

Persons who felt that (A) was better than (B) in vibration absorbing performance—46 persons Persons who did not judge which is better—4 persons A shock resistant baseball helmet according to a second embodiment of the present invention is described below.

Figure 8:
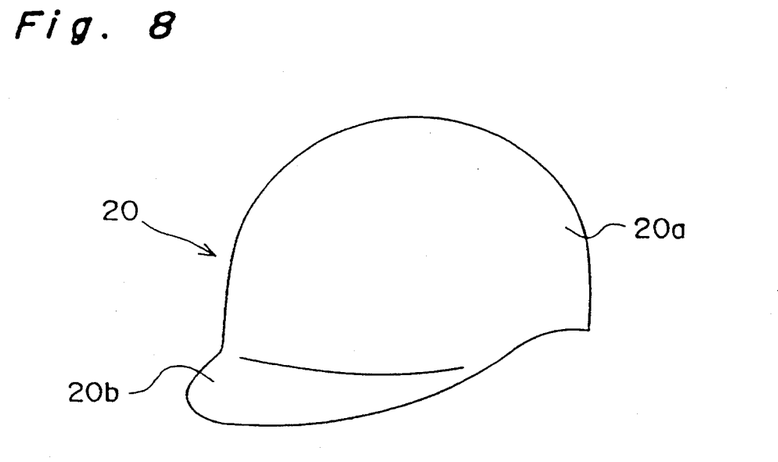
FIG. 8 is a perspective view showing a baseball helmet according to the second embodiment.
Figure 9:
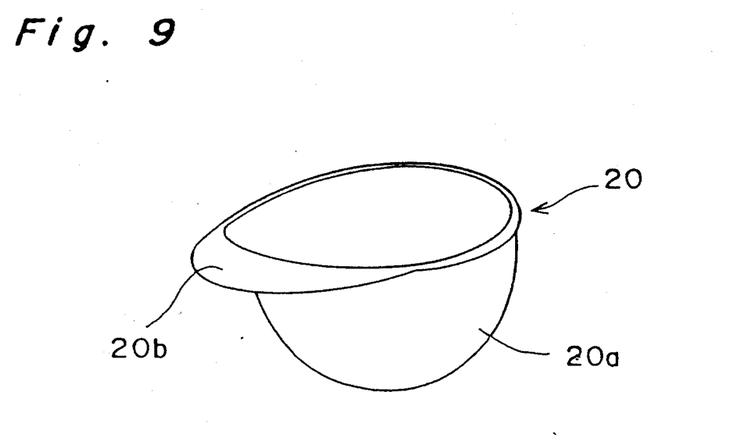
FIG. 9 is a perspective view showing the baseball helmet viewed from bottom portion in FIG. 8.

A baseball helmet 20 as shown in FIGS. 8 and 9 comprises a head 20a and a flange 20b. The fiber reinforcing material of the head 20a consists of an ultra-high-molecular-weight polyethylene fiber cloth layer and a felt-like nonwoven cloth layer consisting of carbon fiber and ultra-high molecular-weight polyethylene mixed with each other. The ultra-high-molecular-weight polyethylene fiber cloth layer and the felt-like nonwoven cloth layer alternate with each other. The head 20a contains fiber in the percentage of 50 by volume. The flange 20b is made of a nonwoven cloth layer consisting of the carbon fiber and ultra-high-molecular-weight polyethylene and contains fiber in the percentage of 20 by volume.

Figure 10:
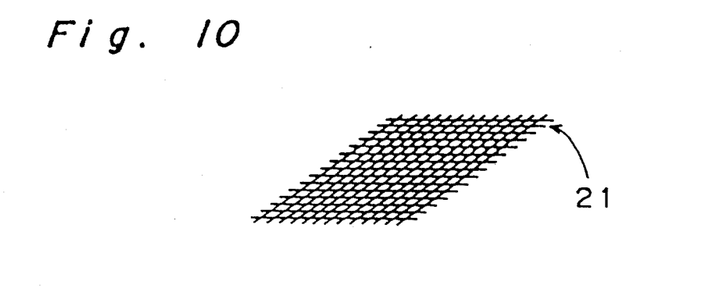
FIG. 10 is a plan view showing the cloth of reinforcing fiber to be used in the second embodiment.
Figure 11:
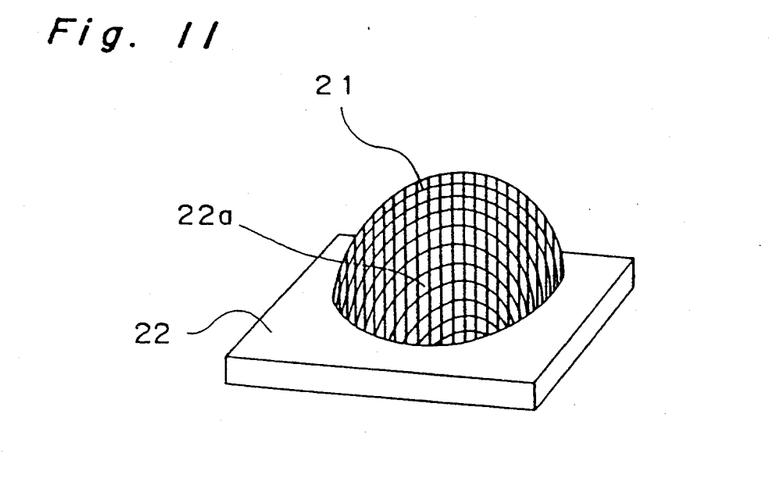
FIG. 11 is a perspective view showing a preforming method according to the second embodiment.

The fiber reinforcing material of the head 20a and the flange 20b is preformed. That is, in case of the head 20a, the periphery of a ultra-high-molecular-weight polyethylene fiber cloth 21 as shown in FIG. 10 is cut in conformity with the surface 22a of a male die 22 of a helmet die as shown in FIG. 11 and surface-treated. A nonwoven cloth layer is laminated alternately on the surface of the ultra-high-molecular-weight polyethylene fiber cloth 21 similarly. These fiber layers are connected with each other by a binder. Thus, the fiber reinforcing materials of the head 20a are integrated with each other by alternating a desired number of both layers with each other. Both fiber reinforcing materials are laminated on each other in the same thickness. The flange 20b consisting of the nonwoven cloth layer is preformed similarly to the head 20a.

Figure 12:
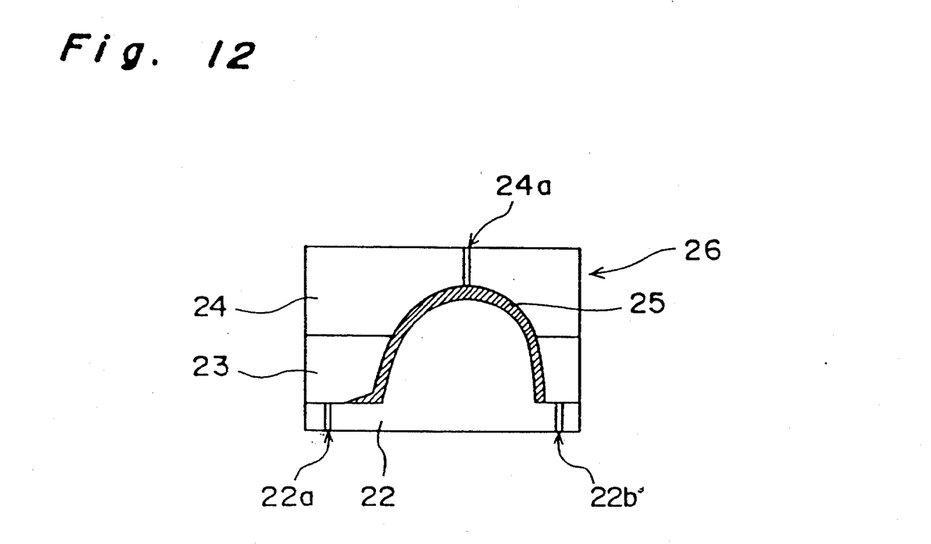
FIG. 12 is a sectional view showing a molding die according to the second embodiment.

After the preformed fiber reinforcing materials of the head 20a and the flange 20b are placed on the male die (lower die), an intermediate die 23 and an upper die 24 are set in position on a cavity 25 in which the fiber reinforcing materials are set. A resin injecting opening 24a communicating with the cavity 25 is formed in the upper die 24 and a resin discharging opening 22b is formed in the lower die 22.

After the dies 23 and 24 are set in position, the mixing head of a resin injector is mounted on the resin injecting opening 24a. Then, the die 26 is heated to 70° C. and made to be vacuous. Then, RIM cyclopentadiene is injected from the injecting opening 24a similarly to the tennis racket frame so that a polymerization occurs in the die 26. RIM cyclopentadiene is injected for eight seconds at a pressure of 10 kg/cm$^2$ and flow rate of 60 cc/sec. Hardening process terminates within one minute after RIM cyclopentadiene is injected. Thus, a helmet as shown in FIGS. 8 and 9 is obtained.

Pressure may be applied in two stages in the above operation. The primary pressure is set to a low pressure a little lower than 10 kg/cm$^2$ and the secondary pressure may be set to 10 kg/cm$^2$. Thus, the pressure generated by the flow of resin does not cause fibers arranged in the cavity 25 from dislocating from each other.

Figure 13:
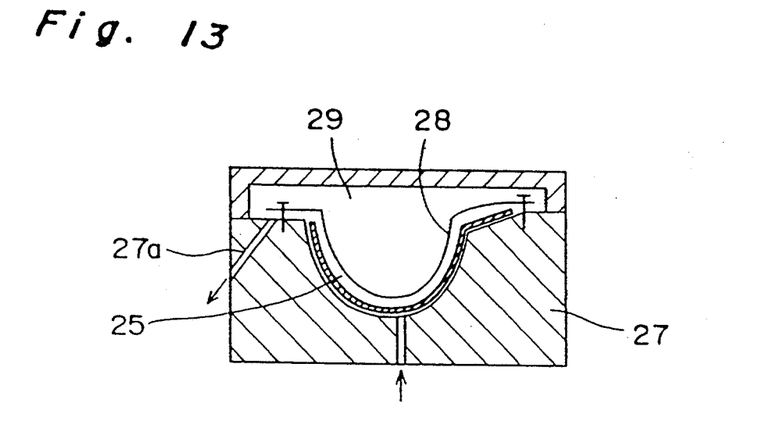
FIG. 13 is a sectional view showing a modified manufacturing method.

The above die 26 may be constructed as follows as shown in FIG. 13: That is, sheet-shaped rubber 28 is provided along a die 27 on which the fiber reinforcing material is provided and a space 29 opposite to the portion in which the fiber reinforcing material is positioned with respect to the rubber 28 communicates with a high pressure supply source not shown. After the resin is injected, the rubber 28 is pressurized to press the fiber reinforcing material against the surface of the die 27 and discharge extra resin from a resin discharge opening 27a.

The above method increases fiber containing percentage in the reinforcing material and improves rigidity and shock resistant performance of the baseball helmet.

In the second embodiment, woven cloth is used as the fiber reinforcing material which is preformed by placing it along the die. In addition to woven cloth, the following may be used as reinforced fiber: continuous strand mat shaped by orienting continuous fiber bundles in random directions, chopped strand mat formed by orienting fiber bundles cut to a certain length, and woven filament winding wound around a cylindrical inner ring.

Figure 14:
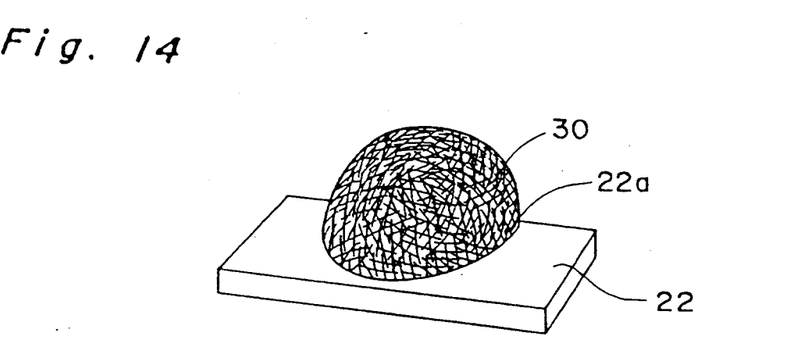
FIG. 14 is a perspective view showing a modified preforming method.

Short fiber or a chopped strand mat 30 serving as a fiber reinforcing material may be sprayed on the die 22 together with a fiber binder as a preforming method as shown in FIG. 14.

Figure 15:
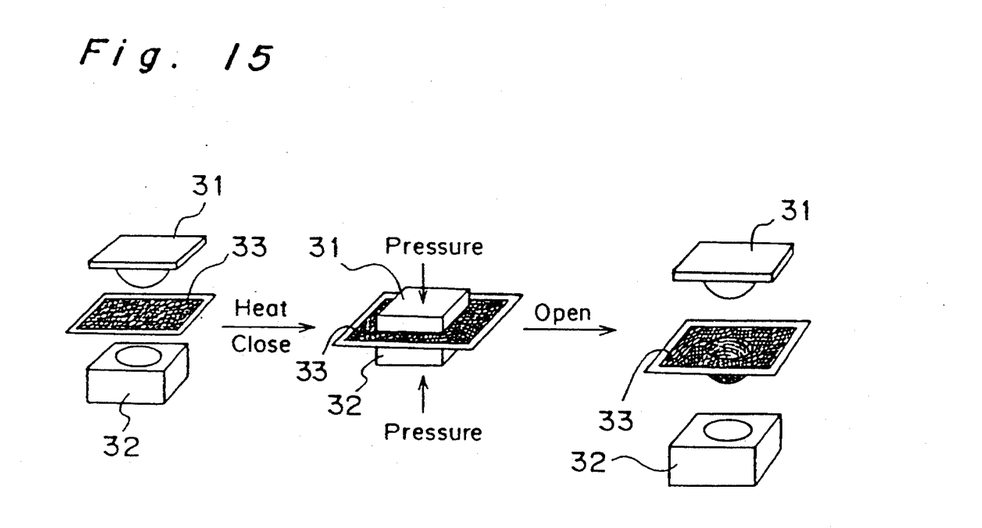
FIG. 15 is a perspective view showing a modified preforming method.

When a continuous strand mat, a cloth mat or a chopped strand mat is preformed as the fiber reinforcing material, a mat 33 is sandwiched between a male die 31 and a female die 32 and then, the dies 31 and 32 are set in position and heated as shown in FIG. 15. As a result, fiber binder melts. Then, fiber bundles are pressurized to form them in conformity with the surface configuration of the die. Thus, the fiber reinforcing material is shaped into the predetermined configuration in advance. According to this method, even though the preformed fiber reinforcing material is taken out from the die and cooled, it maintains its configuration.

Experiment 3

The shock resistant performance of the helmet according to the second embodiment was compared with conventional helmets.

Figure 16:
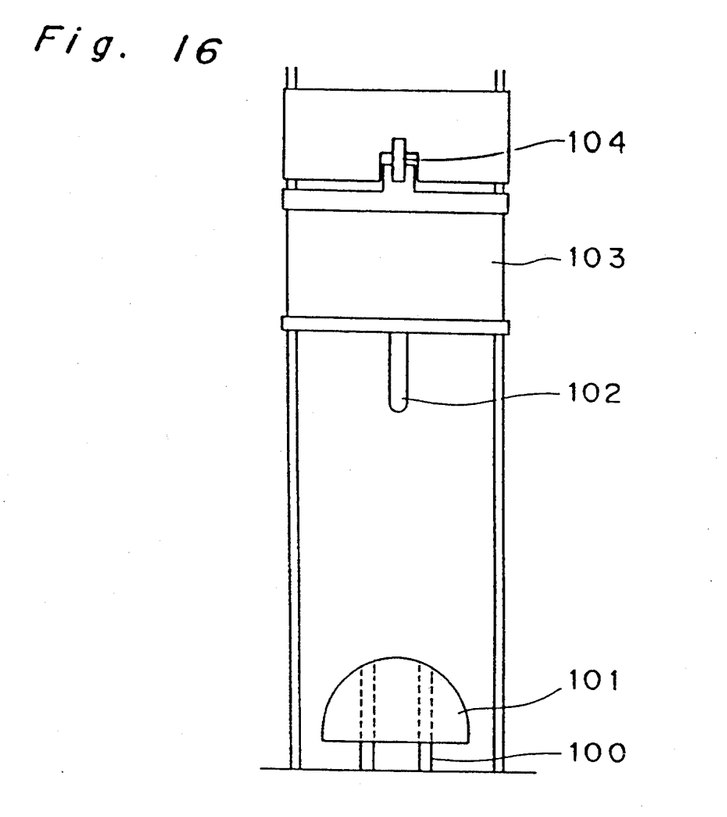
FIG. 16 is a front view showing a testing device for measuring the shock absorbing performance according to the second embodiment.

Tests were conducted on sample semispherical heads of 220 mmin diameter under the condition as shown in Table 1. Penetration tests were conducted using a device as shown in FIG. 16. The test result is shown in Table 2.

TABLE 1

|  | (a) | (b) | (c) | (d) | (e) | (f) | (g) |
|---|---|---|---|---|---|---|---|
| injection pressure (kg/cm$^2$) | — | — | — | 3 | 8 | 15 | 12 |
| injection flow rate (cc/sec) | — | — | — | 30 | 30 | 20 | 30 |
| injection period of time (sec) | — | — | — | 7 | 5 | 4 | 5 |
| kind of woven cloth layer (cloth) | — | — | — | — | carbon fiber | ultra-high-molecular-weight PE | aramid fiber |
| arrangement of nonwoven cloth layer | — | — | — | overall | — | — | — |
| kind of nonwoven cloth layer (component of fiber) | — | — | — | glass-CSM | — | — | — |
| fiber containing persentage | 23.2 | — | — | 30 | 50 | 75 | 60 |

TABLE 2

|  | (a) | (b) | (c) | (d) | (e) | (f) | (g) |
|---|---|---|---|---|---|---|---|
| maximam load (N) | 2350 | 2442 | 4530 | 3830 | 4541 | 12520 | 8200 |
| energy required in penetration (J) | 24.8 | 23.9 | 34.3 | 28.3 | 30.8 | 82.5 | 67.3 |
| thickness (mm) | 2.5 | 3.0 | 3.0 | 3 | 3 | 3 | 3 |

Tests were conducted as follows: A sample 101 was put on a sample holding tool 100 and a weight 103 having a steel striker 102 at the top end thereof is hung by a hook 104. The weight 103 was dropped to examine whether or not the striker 102 penetrated through the sample 101 and measure a maximum load and energy required in penetration therethrough. The weight of the striker 102 was 12.1 kg and its speed was 3.3/sec when it collided with the helmet.

Seven kinds of sample helmets were prepared. In Table 1, reference symbols (a), (b), and (c) denote conventional helmets and (d), (e), (f), and (g) denote helmets according to the present invention.
(a) Long glass fiber is used as fiber reinforcing material. Unsaturated polyester resin is used as matrix resin.
(b) Only ABS is used.
(c) Glass continuous strand mat is used as reinforcing fiber. Unsaturated polyester resin is used as matrix resin.
(d) Glass-CSM is used as reinforcing fiber. Cyclopentadiene resin is used as matrix resin.
(e) Carbon fiber is used as reinforcing fiber. Cyclopentadiene resin is used as matrix resin.
(f) Ultra-high-molecular-weight polyethylene fiber is used as reinforcing fiber. Cyclopentadiene resin is used as matrix resin.
(g) Aramid resin is used as reinforcing fiber. Cyclopentadiene resin is used as matrix resin.

As indicated in Table 2 more energy is required for the striker 102 to penetrate through the helmets of (d) through (g) than for it to penetrate through the conventional helmets (a) through (c). That is, the former is more resistant to a shock than the conventional helmets. Much more energy is required for the striker 102 to penetrate through a helmet comprising ultra-high-molecular-weight polyethylene 10 fiber. Needless to say, the helmet is very resistant to a shock. Therefore, the helmet according to the present invention is very effective for protecting human body.

In addition to the tennis racket frame according to the first embodiment and the baseball helmet according to the second embodiment, the present invention is applicable to shock resistant tools including other protecting sporting tools.

Figure 17:
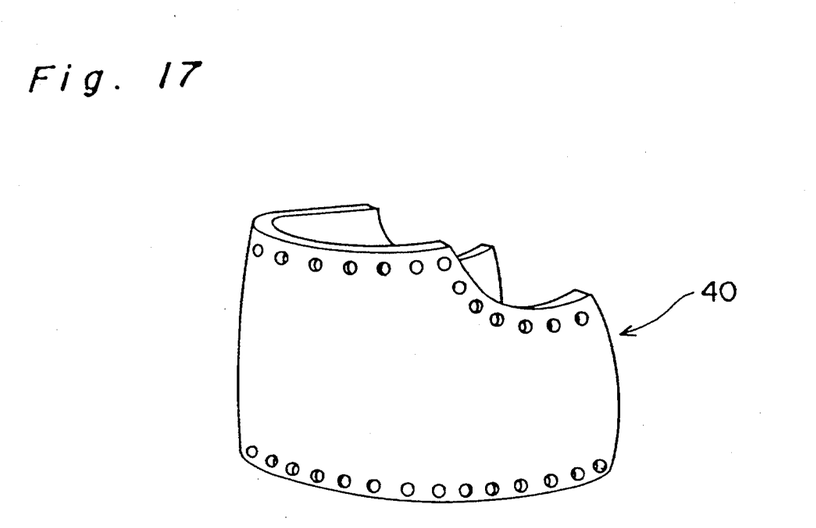
FIGS. 17 through 24 are perspective views showing a shock resistant tool according to the present invention, respectively.
Figure 18:
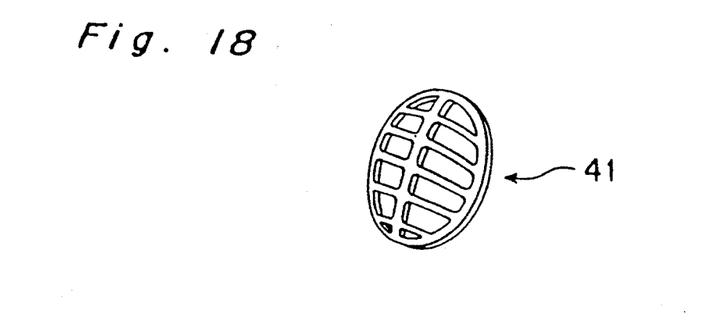
Figure 19:
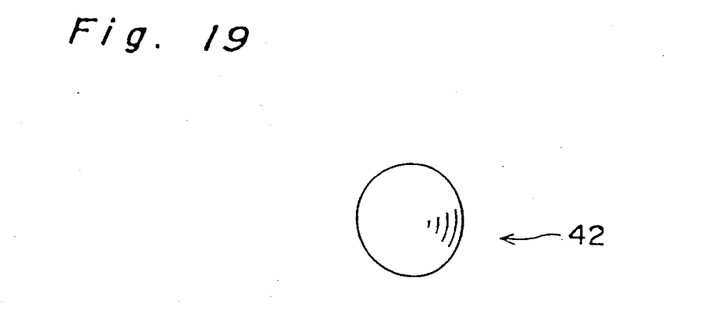
Figure 20:
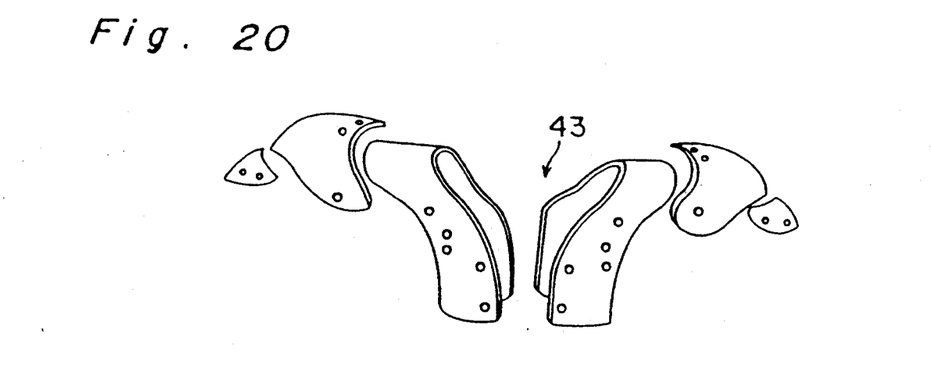
Figure 21:
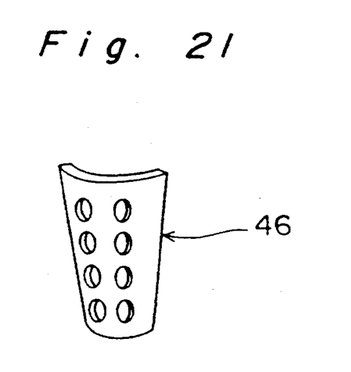
Figure 22:
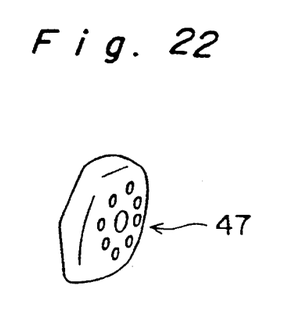

The present invention can be preferably embodied for plastron 40 of fencing as shown in FIG. 17, face-guard 41 of fencing as shown in FIG. 18, crotch protecting tool 42 such as cup of boxing as shown in FIG. 19, football shoulder protecting tool 43 as shown in FIG. 20, soccer leg leguards as shown in FIG. 21, ear portion 45 of water polo cap as shown in FIG. 22, ice hockey face-guard, ice hockey knee pad, ice hockey elbow pad, ski arm protector or the like.

The present invention can also be preferably embodied for a helmet for use in car, on bicycle, in construction work, for infant in play or the like.

Figure 23:
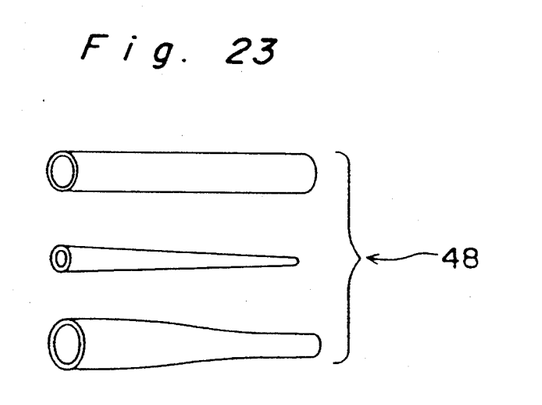
Figure 24:
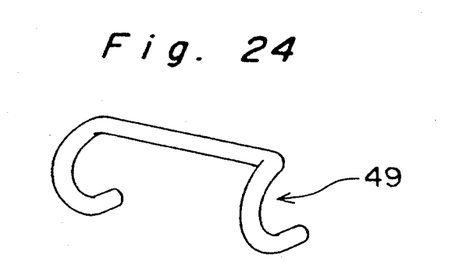

Further, the present invention is also applicable to shock resistant tools, for preventing breakage, such as pipe 48 for use in bicycle frame as shown in FIG. 23, drop handle 49 of a bicycle as shown in FIG. 24, canoe (not shown) or the like.

In addition, the present invention can be used as a face protecting mask in construction work, wall for protecting from machine tool or the like.

TABLE 3-1

|  | fencing face-guard | ice hockey mask | knee pad and elbow pad | soccer leg guards | ear portion of water polo cap |
|---|---|---|---|---|---|
| injection pressure | 10 kg/cm$^2$ | 10 kg/cm$^2$ | 15 kg/cm$^2$ | 5 kg/cm$^2$ | 15 kg/cm$^2$ |
| injection flow rate | 50 cc/sec. | 80 cc/sec. | 20 cc/sec. | 50 cc/sec. | 20 cc/sec. |
| injection period of time | 10 sec. | 8 sec. | 5 sec. | 10 sec. | 5 sec. |
| kind of woven cloth layer(cloth) | carbon fiber | glass + carbon | none | carbon + glass + aramid | none |
| nonwoven cloth layer | laminated with woven cloth alternately | laminated with woven cloth alternately | overall | none | overall |
| kind of nonwoven cloth layer(component of fiber) | carbon fiber + ultra-high molecular-weight PE | glass paper | venyl fiber |  | glass fiber + PPS fiber |
| fiber containing persentage | 40% | 40% | 20% | 60% | 15% |

TABLE 3-2

|  | fencing plastron | crotch protector | football shoulder protecting tool |
|---|---|---|---|
| injection pressure | 20 kg/cm$^2$ | 3 kg/cm$^2$ | 15 kg/cm$^2$ |
| injection flow rate | 70 cc/sec. | 20 cc/sec. | 80 cc/sec. |
| injection period of time | 20 sec. | 6 sec. | 30 sec. |
| kind of woven cloth layer(cloth) | glass fiber | carbon + aramid | carbon fiber |
| nonwoven cloth layer | laminated on every second glass fiber layer | none | laminated with carbon fiber layer alternately |
| kind of nonwoven cloth layer (component of fiber) | carbon fiber + PPS fiber | none | nylon fiber |
| design of fiber layer | glass fiber + woven cloth (overall) | carbon fiber (overall) | nonwoven cloth layer only (at the breast portion) |
| fiber containing persentage | 40%(overall) | 65% (overall) | shoulder 40% breast 20% |

TABLE 3-3

|  | helmet for construction | helmet in riding bicycle | helmet for infant's play | helmet in riding car |
|---|---|---|---|---|
| injection pressure(kg/cm$^2$) | 4 kg/cm$^2$ | 7 kg/cm$^2$ | 3 kg/cm$^2$ | 12 kg/cm$^2$ |
| injection flow rate(cc/sec.) | 60 cc/sec. | 70 cc/sec. | 50 cc/sec. | 50 cc/sec. |
| injection period of time(sec) | 8 sec. | 7 sec. | 5 sec. | 10 sec. |
| kind of woven cloth layer | glass fiber | carbon + glass | none | aramid fiber |

TABLE 3-3-continued

|  | helmet for construction | helmet in riding bicycle | helmet for infant's play | helmet in riding car |
|---|---|---|---|---|
| (cloth) nonwoven cloth layer | repeat 1 woven cloth layer + 2 nonwoven cloth layer | 1 woven cloth layer + 1 nonwoven cloth layer + 1 CSM | overall | laminated on every forth aramid fiber |
| kind of nonwoven cloth layer (component of fiber) | glass-CSM | acrylic fiber + carbon fiber | PPS fiber | glass + carbon + PPS fiber |
| design of fiber layer | cover top portion with glass cloth | constructed as above (overall) | constructed as above | aramid fiber + nonwoven |
| fiber containing persentage | top portion 50% peripheral portion 30% | 50% (overall) | 20% | 70% cloth (overall) (overall) |

TABLE 3-4

|  | bicycle frame | bicycle handle | canoe |
|---|---|---|---|
| injection pressure | 5 kg/cm² | 5 kg/cm² | 20 kg/cm² |
| injection flow rate | 100 cc/sec. | 30 cc/sec. | 150 cc/sec. |
| injection period of time | 10 sec. | 8 sec. | 2 min. |
| kind of woven cloth layer (cloth) | braid of carbon | braid of carbon | ultra-high polymer PE |
| nonwoven cloth layer | none | none | repeat 4 woven cloth layer + 2 nonwoven cloth layer |
| kind of nonwoven cloth layer (component of fiber) |  |  | carbon fiber + ultra-high polymer PE |
| fiber containing persentage | 80% | 70% | 40% |
| merit of production using cyclopentadiene | prevent breakage against a shock provide vibration absorption | prevent breakage against a shock provide vibration absorption | prevent breakage against a shock |

Tables 3-1, 3-2, 3-3 and 3-4 show conditions in RIM molding (injection pressure, injection period of time, injection flow rate), kind of reinforcing fiber, whether or not nonwoven cloth is provided, method for arranging nonwoven cloth, kind of nonwoven cloth, distribution of reinforcing fiber and nonwoven cloth (design of fiber layer), and content percentage of fiber.

As shown in Table 3-1, 3-2, 3-3 and 3-4 in the above-described embodiments, injection pressure is set to less than as low as 20 kg/cm² and mixing and injections are carried out at a low pressure when fiber density is high.

The distribution of nonwoven cloth is as follows: A region which does not require a high strength comprises a nonwoven cloth layer. A region which requires high strength comprises nonwoven cloth layers and reinforcing fiber layers which alternate with each other so as to accelerate the flow of resin. A region which requires a very high strength comprises a reinforcing fiber layer only.

Penetration tests were conducted on the above-described shock resistant tools and conventional ones in the same configuration by the same device as shown in FIG. 16. Test results are as shown in Table 4.

TABLE 4

|  | impact load |  | shape of striker |
|---|---|---|---|
| fencing plastron | conventional example | 2500N penetrated | stick having a semipherical |
|  | experiment | 7300N penetrated | head of 0.5 inch in diameter |
| crotch protector | conventional example | 2200N penetrated | stick having a semipherical |
|  | experiment | 5400N penetrated | head of 0.5 inch in diameter |
| football shoulder protecting tool | conventional example | 3600N penetrated | stick having a cone head of |
|  | experiment | 6300N penetrated | top angle 60° |
| knee pad and elbow pad | conventional example | 4500N transformed | stick having a semipherical |
|  | experiment | 8100N transformed | head of 42 mm in diameter |
| succer leg guards | conventional example | 2700N penetrated | stick having a semipherical |
|  | experiment | 6200N penetrated | head of 5 mm in diameter |
| bicycle frame | conventional example | 3300N broken | wedge-shaped |
|  | experiment | 8800N broken |  |
| bicycle handle | conventopnal example | 2600N broken | wedge-shaped |
|  | experiment | 6900N broken |  |

The constructions of shock resistant tools according to the embodiments of the present invention are as shown in Tables 3-1, 3-2, 3-3 and 3-4 and 4 while those of conventional shock resistant tools are as follows:

* Plastron of fencing: prepreg formed by impregnating carbon fiber with unhardened epoxy resin was stuck to a die and then, heated and pressurized to harden it.
* Fencing face-protecting mask: iron pipe
* Crotch protecting tool: nylon resin (injection molding) commercially available
* Football shoulder protecting tool: ultra-high-density polyethylene resin (injection) commercially available
* Elbow pad and knee pad: ABS resin (injection molding) commercially available
* Soccer leg guards: nylon resin (injection molding) commercially available
* Bicycle frame pipe: epoxy resin reinforced with carbon fiber (interior: urethane foam), handle made of light alloy commercially available Results of shock tests are shown in Table 4.

Shock tests were conducted in addition to the penetration test.

Fencing plastron was struck with bamboo swords. A shock was felt in the case of the conventional plastron, but a shock was felt in a smaller extent in the case of the plastron according to the embodiment.

The weight of conventional fencing face-guard was 1100 g while that of the embodiment was 155 g. Both face-guard were struck with bamboo swords 500 times. The result is that neither the conventional face-guard nor that of the embodiment was broken. Thus, the shock resistant performance of both face-guards were similar although the face-guard of the embodiment was lighter than the conventional one.

The weight of conventional bicycle handle made of light alloy was 290 g while the bicycle handle made of light alloy of the embodiment was 210 g. The bicycle handle of the embodiment was more operable than the conventional one because the former was lighter than the latter.

As apparent from the foregoing description, a shock resistant tool according to the present invention such as a racket frame or a helmet contains cyclopentadiene resin, having a low melt viscosity, which is used as matrix resin, fiber can be contained in the material of the shock resistant tool at higher percentage. That is, fiber can be contained therein at a desired percentage higher than 40% while according to the conventional method, fiber is contained therein at approximately 30%. Since cyclopentadiene resin is superior in specific strength and specific rigidity, shock resistant performance of shock resistant tool according to the present invention can be outstandingly improved.

Shock resistant performance can be improved by using, as reinforcing fiber, continuous fiber or long fiber comprising ultra-high-molecular-weight polyethylene fiber superior in shock resistant performance. In addition, cyclopentadiene resin has a favorable vibration damping performance as well as shock resistant performance. Therefore, a shock resistant tool, for example, a racket frame comprising cyclopentadiene resin is superior in vibration damping characteristic. That is, vibration generated by hitting a ball is transmitted to elbow in a reduced extent. Therefore, the racket frame is preferably used by a powerless player.

Since reaction injection molding method is employed, resin injection period of time is less than 10 seconds and the hardening terminates within one minute. Therefore, molding cycle is very short and productivity is favorable.

Further, fibers provided in a die are not dislocated from each other and fiber can be contained in a predetermined percentage according to a region by setting the balance of flow rate, pressure, and period of time and applying a low pressure during a resin injecting operation. In particular, the dislocation of fibers can be effectively prevented by preforming the reinforcing fiber.

Resin is capable of flowing smoothly by alternating the reinforcing fiber and nonwoven cloth with each other. The weight of a shock resistant tool can be reduced if a region in which a high strength is not required consists of nonwoven cloth. Hence, manufacturing cost is low.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a shock resistant tool by reaction injection molding, comprising the steps of:
   preforming at least one reinforcing fiber selected from the group consisting of ultra-high-molecular-weight polyethylene fiber, carbon fiber, glass fiber, aramid fiber, alumina fiber, silicon carbide fiber, steel fiber, amorphous metal fiber and combinations thereof into a desired configuration for the tool;
   placing said preformed reinforcing fiber along a die having the desired configuration for the tool;
   placing a flexible member on said preformed reinforcing fiber such that said preformed reinforcing fiber is between said flexible member and said die;
   injecting a cyclopentadiene resin as a matrix resin into a cavity containing the preformed reinforcing fiber formed by the surfaces of said flexible member and said die; and
   applying pressure to said flexible member on the surface opposite said cavity, to thereby obtain said shock resistant tool.

2. The method for manufacturing a shock resistant tool according to claim 1 wherein the flexible member is a sheet-shaped rubber.

3. The method for manufacturing a shock resistant tool according to claim 1, wherein the flexible member is a nylon tube.

* * * * *